June 16, 1959 A. M. GINDRE 2,890,902
STAND FOR CAMERAS AND THE LIKE
Filed Jan. 31, 1956 2 Sheets-Sheet 1
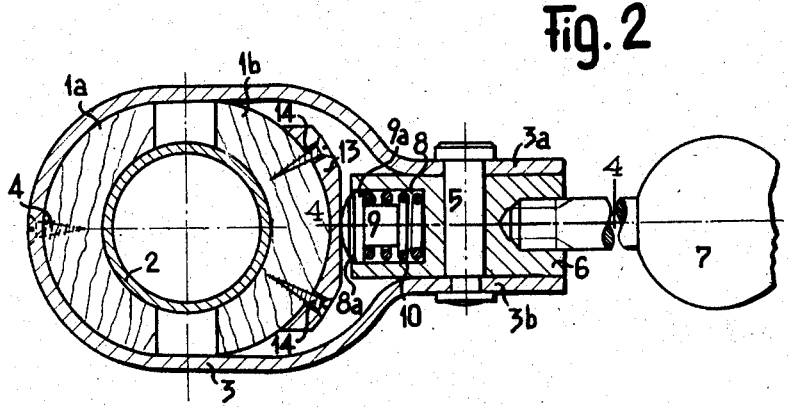
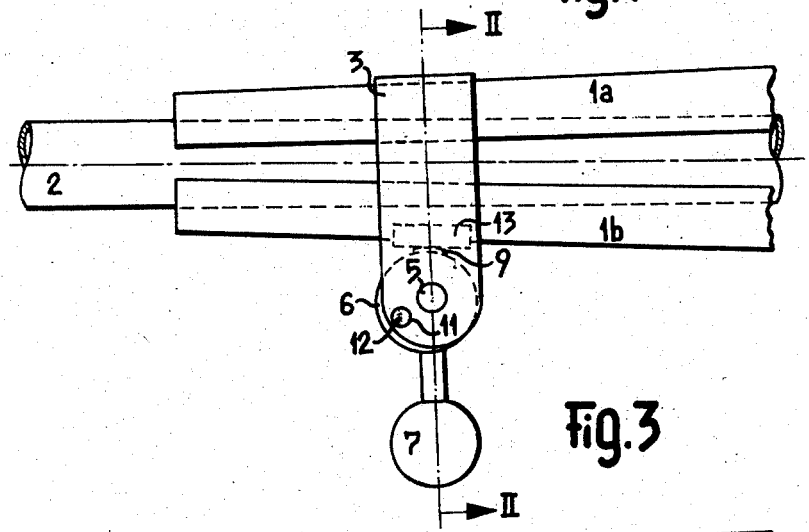
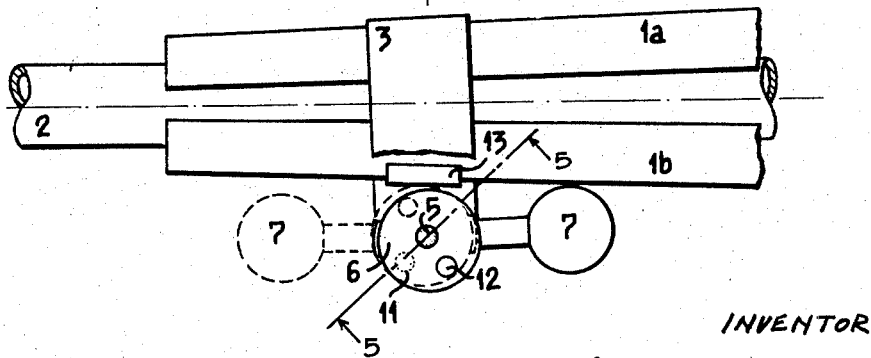
INVENTOR
ANDRE M. GINDRE
BY Emory L. Groff
Atty June 16, 1959    A. M. GINDRE    2,890,902
STAND FOR CAMERAS AND THE LIKE
Filed Jan. 31, 1956    2 Sheets-Sheet 2

INVENTOR
ANDRE M. GINDRE

United States Patent Office 2,890,902
Patented June 16, 1959

2,890,902

STAND FOR CAMERAS AND THE LIKE

Andre Marcel Gindre, Carouge-Geneva, Switzerland, assignor to Paillard S.A., Sainte-Croix, Switzerland, a corporation of Switzerland Application January 31, 1956, Serial No. 562,504

Claims priority, application Switzerland February 2, 1955

3 Claims. (Cl. 287—54)

My invention has for its object a stand intended more particularly for cameras and constituted by at least one upright or leg of adjustable length including at least two sections slidingly engaging each other while an eccentric clamping member is provided so as to secure said two sections together in the desired relative longitudinal position.

Stands for cameras generally in use comprise several relatively fixed leg sections carried by the camera base of a tripod and a ground engaging leg adjustable relative thereto. One of the objections to clamping means now in use for holding the fixed and adjustable leg sections together is that when they are released from a tightened position, the ground engaging leg has a tendency to drop from between the fixed leg sections. For example, assuming that the clamping device is tightened to its maximum extent, it is first necessary to release it which permits the ground engaging leg to slide so freely it overruns the desired adjustment and the leg must be brought back and tightened at the correct point. Thus, all in all the adjustment of prior clamps becomes a more or less protracted and tedious procedure depending upon the duration of adjustment.

Accordingly, the present invention has for its primary object a construction which eliminates the objections above referred to by providing a clamping device including a cam, which between the points of maximum angular movement, that is from full clamping to full release, has an intermediate position in which a spring-pressed plunger or the like exerts sufficient pressure on the telescoped leg elements so that the ground engaging leg will be held with a controlled degree of friction while the desired adjustment is being precisely made. Thereafter, the clamp may be retightened. In that connection, the invention contemplates a cam mounted on a clamping band or support and having a handle disposed radially to the axis on which the cam is mounted, and, the handle may be moved by the finger of one hand from the full clamping position to an intermediate position where it is temporarily held automatically to let the user know that the ground engaging leg is free to move under controlled conditions.

I have illustrated diagrammatically in the accompanying drawings a preferred embodiment of my improved stand, said embodiment being selected by way of a mere exemplification. In said drawings:

Fig. 1 shows a section of a leg with its clamping means in a position of easy fit.

Fig. 2 is a cross-section through line II—II of Fig. 1.

Fig. 3 is a view similar to Fig. 1 showing the clamping means in their released position and in their tight fit position respectively.

Figure 4:
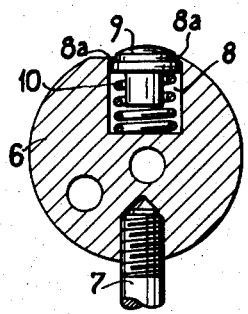
Fig. 4 is a horizontal cross section taken on the line 4—4 of Fig. 2.
Figure 5:
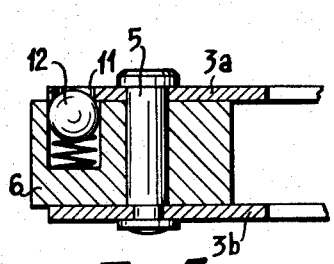
Fig. 5 is a vertical cross section taken on the line 5—5 of Fig. 1.
Figure 6:
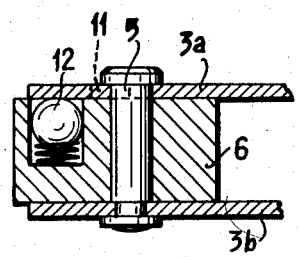
Fig. 6 is a view similar to Fig. 5, but illustrating the position of the spring pressed ball as it would appear in the position of the lever shown in Fig. 3.
Figure 7:
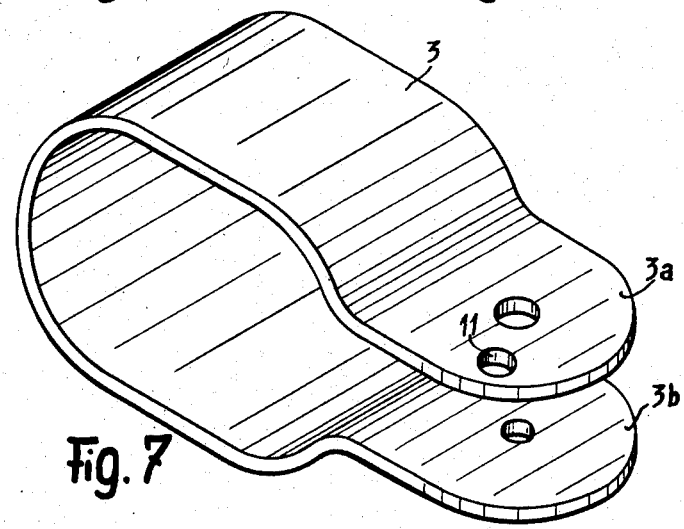
Fig. 7 is a perspective view of the strap disassociated from the cam.

As readily apparent from inspection of the drawing, the adjustable leg includes two sections of which one is constituted by two cooperating wooden or the like slideways 1a and 1b having semi-circular outlines facing each other and pivotally secured to the carrier end of the stand. The other section is constituted e.g. by an aluminum ground-engaging tube 2 adapted to slide between the slideways 1a and 1b so as to adjust the length of the leg.

The arrangement for clamping the tube 2 between the slideways 1a and 1b near the free ends of the latter includes a strap 3 the medial part of which is secured to the slideway 1a through the screws 4 while its substantially angularly offset ends providing spaced ears 3a and 3b are interconnected through a short spindle 5 to which is pivotally secured an eccentric element or cam 6 facing the slideway 1b enclosed with the slideway 1a inside the strap. A handle 7 is secured to the outer part of the cam 6 so as to provide for its angular shifting. At a point diametrically opposed to said handle 7, the cam 6 is provided with a radial bore 8 inside which is housed a plunger 9 whose outer head portion faces the slideway while its shank, which is of less diameter than the head, is disposed within the recess 8 and provided with a coil spring 10 acting through compression and held between the bottom of the recess 8 and a shoulder 9a formed beneath the head of the plunger 9 so as to urge the plunger outwardly with reference to the cam 6.

The outward movement of the plunger 9 is limited by the inturned edge 8a of the recess which is deformed so as to provide an abutment for the annular shoulder 9a on the plunger.

One of the ends 3a of the strap 3 is provided with an opening 11 adapted to cooperate with a ball 12 housed elastically inside the cam 6 so as to form a stop for a predetermined angular position of the cam round its spindle 5. A suitable shaped plate 13 is secured by screws 14 to the outer surface of the slideway 1b and serves for transmitting to the latter the clamping stresses produced by the cam 6 and by the plunger 9 carried by the latter.

When a stand including at least one adjustable leg of the type described is to be conveyed from one point to another, the handle 7 controlling the clamping means should be shifted into the position shown in dotted lines in Fig. 3, for which position the cam is urged against the small plate 13 and consequently holds the tube 2 fast by clamping it to a maximum extent between the two slideways 1a and 1b.

During operation, the user of the stand holds the stand vertically in one hand, so that the free end of the tube 2 may face the ground while he controls through his other hand the handle 7 so as to return it into its other extreme position shown in solid lines in Fig. 3 and to release the clamping action of the cam. Since the tube 2 is no longer clamped between the slideways 1a and 1b it slides downwardly under the action of gravity until it reaches ground. The operator then shifts again the handle 7 so as to return it into its medial position illustrated in Figs. 1 and 2, which position is defined by the engagement of the ball 12 inside the opening 11. The plunger 9 now exerts a thrust on the plate 13 under the action of its springs 10 and provides for a sufficient clamping of the tube 2 between the slideways 1a and 1b. The elastic power of the spring is selected so that an easy fit is obtained which is sufficient to prevent the weight of the camera from producing a sliding movement of the tube 2 inside the slideways 1a and 1b upwardly, while allowing a manually controlled shifting of said tube inside the slideways.

The cam being thus secured in the manner illustrated in Figs. 1 and 2, the operator may release the stand and secure the camera to it if this has not been already done and proceed with the final adjustment of the height of the stand without it being necessary for him to release the clamping means by reason of the sliding fit obtained as described hereinabove. This final adjustment being executed, the operator returns the handle 7 into the position corresponding to a tight fit of the tube 2 between the slideways 1a and 1b, said position of the handle 7 being shown as already mentioned in dotted lines in Fig. 3. It is apparent that, by reason of this intermediate easy fit position, the stand according to my invention does not show the above referred to drawbacks. The operator need no longer proceed with a succession of releasing and tightening steps on the clamping means during the final adjustment of the height of the stand, which steps required in the case of prior arrangements the operator to assume a bent and unpleasant position. With the present stand, according to my invention, the operator remains always in an erect position and may adjust the height of the stand through a mere pressure or traction exerted on the adjustable leg of the stand. Furthermore, he has no longer to interfere with the clamping means during the adjustment and his two hands remain free for holding the camera with its stand.

What I claim is:

1. A clamping device for facilitating the selective setting of the ground engaging leg sections of a camera tripod relative to the leg sections fixed to the camera base, said device comprising, a strap in the form of a loop embracing all of said leg sections and having laterally projecting spaced end portions, a spindle connecting said end portions, a cam rotatably mounted on the spindle between said spaced end portions and having a clamping zenith and a bore at one side of said zenith, radial to the axis of the spindle, said bore opening at the periphery of the cam, a manipulating handle on the cam and having its longitudinal axis alined with the axis of said bore, a plunger spring-biased outwardly from said bore, a plate carried by one of said fixed leg sections, said cam when manipulated by the handle to a point where the axis of the handle is substantially alined with the transverse plane of the clamp, the spring-pressed plunger engages the plate, and, when the cam and handle are moved to place the handle substantially parallel to the leg members the zenith of the cam forcibly locks the leg members together.

2. A clamping device for facilitating the selective setting of the ground engaging leg sections of a camera tripod relative to the leg sections fixed to the camera base of the tripod, said device comprising, a strap in the form of a loop embracing all of said leg sections and having laterally offset spaced end portions, a spindle fixed in said end portions, a cam on said spindle having a clamping zenith and radial bore whose outer end opens at the periphery of the cam, a spring-pressed plunger fitted in said bore, a handle for the cam having its axis alined with the axis of the bore and extending opposite the open end of the bore, said cam having its zenith between the plunger and the axis of the handle, whereby, when the handle and plunger are disposed substantially at right angles to the legs, the plunger will exert light spring pressure on the fixed leg sections, and when the handle and cam proceed to bring the zenith to exert pressure of greater magnitude than the plunger, the fixed leg members will be securely clamped together with the ground engaging leg, and cooperating means on the cam and one of the ends of the clamp to automatically arrest movement of the cam to indicate when the plunger is in engagement with the plate.

3. A clamping device for facilitating the selective setting of the fixed and adjustable leg sections of a camera tripod, including, a leg embracing band, a quickly settable and quickly releasable cam pivotally supported on said band and having at its periphery to one side of its zenith a yieldable plunger element for exerting less force on the adjustable leg sections than the zenith of the cam, and means on the cam and band for defining the position of the cam in which said yieldable element is in pressure exerting relation to the leg sections.

References Cited in the file of this patent

UNITED STATES PATENTS

| | | |
|---|---|---|
| 428,542 | Wright | May 20, 1890 |
| 988,807 | Paetz | Apr. 4, 1911 |
| 1,546,739 | Le Lande | July 21, 1925 |
| 1,609,396 | Blonigen | Dec. 7, 1926 |
| 1,808,848 | Haynes | June 9, 1931 |
| 2,538,118 | Miller | Jan. 16, 1951 |